United States Patent [19]

Okamoto et al.

[11] Patent Number: 5,206,580
[45] Date of Patent: Apr. 27, 1993

[54] MAGNETOELECTRIC GENERATING SYSTEM

[75] Inventors: Hitoshi Okamoto; Katsuhiko Kibe, both of Nagasaki, Japan

[73] Assignee: Mitsubishi Denki Kabushiki Kaisha, Tokyo, Japan

[21] Appl. No.: 854,866

[22] Filed: Mar. 19, 1992

[30] Foreign Application Priority Data

Jun. 4, 1991 [JP] Japan ................... 3-159465

[51] Int. Cl.$^5$ ................... H02P 9/00; H02P 9/10
[52] U.S. Cl. ................... 322/46; 322/28; 322/89
[58] Field of Search ............. 322/46, 89, 28, 100, 322/99, 58

[56] References Cited

U.S. PATENT DOCUMENTS

| | | | |
|---|---|---|---|
| 4,350,947 | 9/1982 | Uenosono et al. | 322/17 |
| 4,642,502 | 2/1987 | Carpenter et al. | 310/156 |
| 4,885,526 | 12/1989 | Szabo | 322/46 X |

FOREIGN PATENT DOCUMENTS

| | | | |
|---|---|---|---|
| 2659600 | 7/1978 | Fed. Rep. of Germany | 322/46 |
| 58-31790 | 3/1983 | Japan . | |
| 60-2867 | 1/1985 | Japan . | |
| 0892639 | 12/1981 | U.S.S.R. | 322/46 |

Primary Examiner—R. J. Hickey
Attorney, Agent, or Firm—Burns, Doane, Swecker & Mathis

[57] ABSTRACT

The present invention is intended for maintaining constant the output voltage of a synchronous magnetoelectric generator without reducing the efficiency of the synchronous magnetoelectric generator regardless of load variation. A magnetoelectric generating system in accordance with the present invention comprises a synchronous magnetoelectric generator, a synchronous phase modifier connected to the output side of the synchronous magnetoelectric generator, a voltage detector for detecting the output voltage of the synchronous magnetoelectric generator, a comparator for comparing the output of the synchronous magnetoelectric generator detected by the voltage detector and a reference voltage set by means of a voltage setting device, an exciting current regulating circuit connected to the field winding of the synchronous phase modifier, and a controller. The controller controls the exciting current regulating circuit according to the output of the comparator.

10 Claims, 7 Drawing Sheets

MAGNETOELECTRIC GENERATING SYSTEM

BACKGROUND OF THE INVENTION

1. Field of the Invention

The present invention relates to a magnetoelectric generating system employing a synchronous magnetoelectric generator to generate electric power of a fixed output voltage.

2. Description of the Prior Art

FIGS. 1 and 2 are a sectional front view and a sectional side view, respectively, of a conventional synchronous magnetoelectric generator. The synchronous magnetoelectric generator has a frame 31, a rotor shaft 36, bearings 32 and 33 supporting the rotor shaft 36, a stator core 34, a stator coil 35 (output coil), and permanent magnets 37 fixed to the rotor shaft 36 to create a rotating magnetic field. The stator core 34 and the stator coil 35 constitute an armature.

In operation, a magnetic flux produced by the synchronous magnetoelectric generator is dependent on the operating characteristics between the magnetic flux density B of the permanent magnets for creating a rotating magnetic field, and magnetomotive force H, and the output voltage of the magnetoelectric generator fluctuates according to the load current. The lagging current among the components of the load current has demagnetizing effect that reduces the output voltage. The leading current has magnetizing effect that increases the output voltage. Accordingly, the output voltage characteristics of the synchronous magnetoelectric generator are dependent on load power factor and the synchronous magnetoelectric generator is unable to maintain its output voltage constant. Therefore, the synchronous magnetoelectric generator has been applied to limited purposes for which the synchronous magnetoelectric generator need not be controlled and voltage fluctuation is not a problem. It has been known to use a Zener-diode voltage regulator circuit in combination with a synchronous magnetoelectric generator of a comparatively small capacity as shown in FIG. 3 to provide power of a constant voltage.

Shown in FIG. 3 are a synchronous magnetoelectric generator 1, a voltage detector 5 for detecting the voltage across the two phases of the synchronous magnetoelectric generator 1, breakers 9 provided in lines for the phases, respectively, a prime mover 10 directly coupled with the synchronous magnetoelectric generator 1 with a shaft coupling, a load 11, three pairs of Zener diodes 40, and limiting resistors 41. The two paired Zener diodes 40 are connected reverse to each other between the two phases. If the output voltage of the synchronous magnetoelectric generator increases beyond a fixed value, one of the two paired Zener diodes 40 becomes conductive for voltage peak clipping, so that a constant voltage is applied to the load 11.

Since the conventional synchronous magnetoelectric generator has such characteristics, peak voltage clipping is necessary to obtain a constant voltage. Therefore, the operating efficiency of the synchronous magnetoelectric generator is very low, and the synchronous magnetoelectric generator is unable to recover the voltage when the voltage tends to drop due to variation in the load. Techniques similar to such a conventional synchronous magnetoelectric generator are disclosed in Japanese Utility Model Publication No. Sho 60-3670.

SUMMARY OF THE INVENTION

The present invention has been made to solve the foregoing problems and it is therefore an object of the present invention to provide a magnetoelectric generating system including a synchronous magnetoelectric generator, capable of preventing reduction in the operating efficiency of the synchronous magnetoelectric generator even if the load on the synchronous magnetoelectric generator varies and of maintaining the output voltage of the synchronous magnetoelectric generator constant.

The present invention provides a magnetoelectric generating system comprising a synchronous magnetoelectric generator, a synchronous phase modifier connected to the output side of the synchronous magnetoelectric generator, a voltage detector for detecting the output voltage of the synchronous magnetoelectric generator, a comparator for comparing the voltage detected by the voltage detector and a reference voltage set by a voltage setting device, an exciting current regulating circuit connected to the field winding of the synchronous phase modifier, and a controller for controlling the exciting current regulating circuit on the basis of the output of the comparator.

The synchronous phase modifier employed in the magnetoelectric generating system in accordance with the present invention is connected to the output side of the synchronous magnetoelectric generator, and the exciting current supplied to the synchronous phase modifier is controlled to regulate the armature current of the synchronous phase modifier and to cancel the magnetizing and demagnetizing components of the load current, and the output current of the synchronous magnetoelectric generator is controlled so that the output voltage of the synchronous magnetoelectric generator remains constant.

DETAILED DESCRIPTION OF THE PREFERRED EMBODIMENTS

Figure 1:
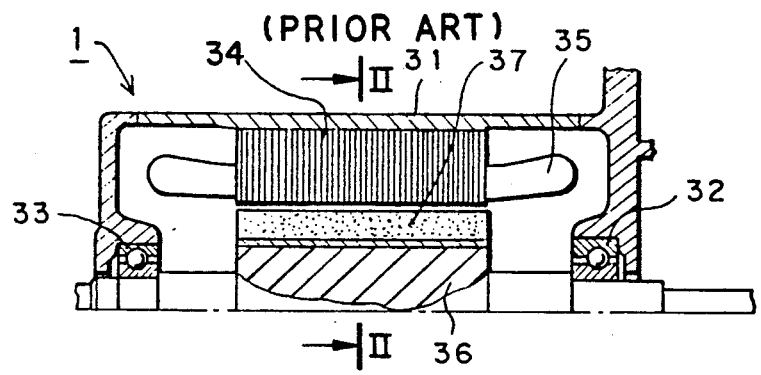
FIG. 1 is a half longitudinal sectional view of a typical synchronous magnetoelectric generator.
Figure 2:
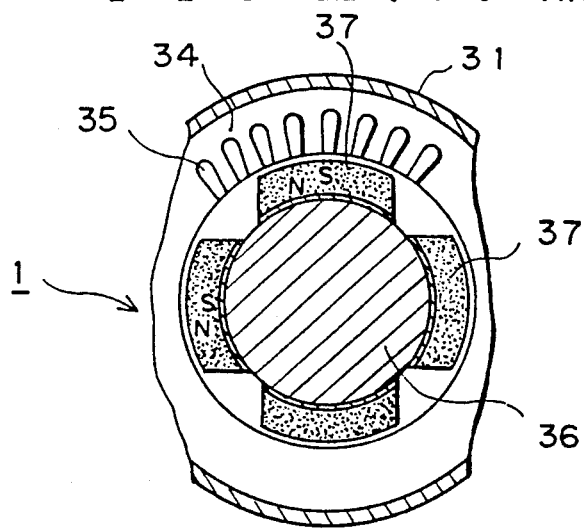
FIG. 2 is a sectional side elevation taken on line II—II in FIG. 1.
Figure 3:
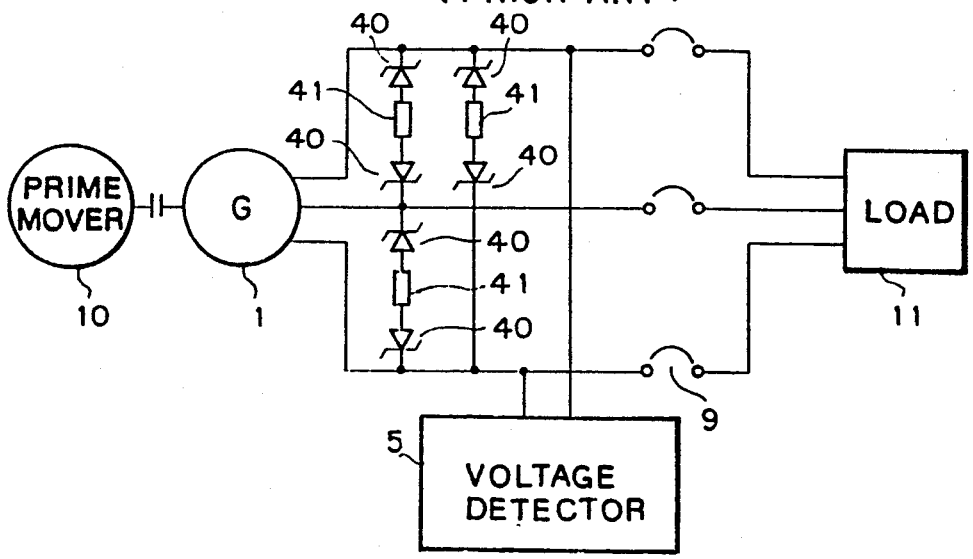
FIG. 3 is a circuit diagram of a conventional magnetoelectric generating system.
Figure 4:
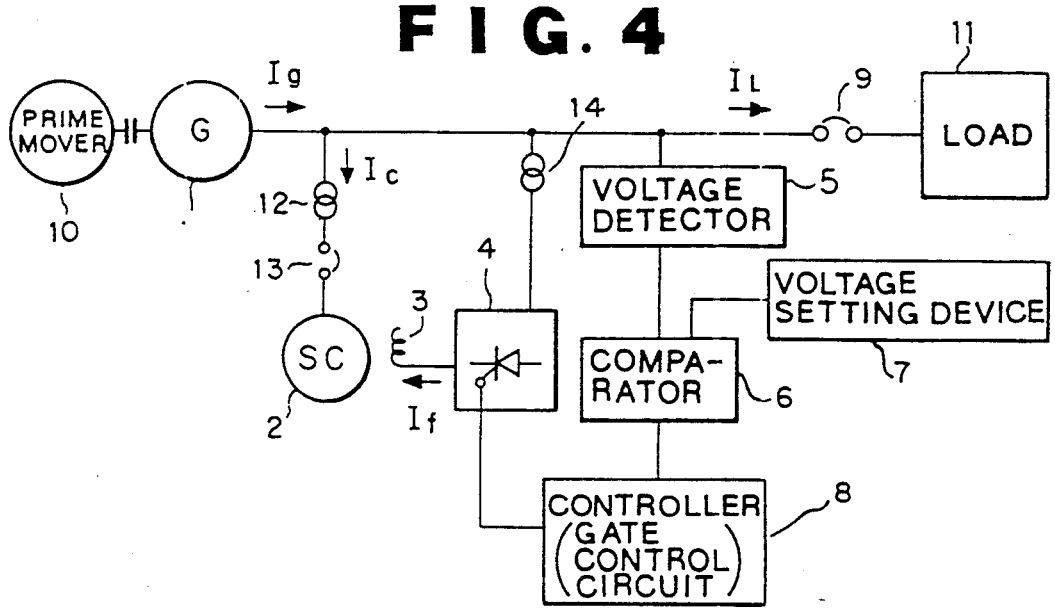
FIG. 4 is a block diagram of a magnetoelectric generating system in a first embodiment according to the present invention.

Referring to FIG. 4 showing a magnetoelectric generating system in a first embodiment according to the present invention, there are shown a synchronous magnetoelectric generator 1 having permanent magnets for creating a rotating magnetic field, a synchronous phase modifier 2 connected to the output side of the synchronous magnetoelectric generator 1, the field winding 3 of the synchronous phase modifier 2, a plurality of thyristors 4 forming an exciting current regulating circuit for supplying an exciting current to the field winding 3 for rectifying an alternate current and for controlling the exciting current, a voltage detector for detecting the output voltage of the synchronous magnetoelectric generator 1, a comparator 6 for comparing the output of the voltage detector 5 and a reference voltage, a voltage setting device 7 for setting a reference voltage, a controller for controlling the thyristors 4 connected to the field winding 3 of the synchronous phase modifier 2 on the basis of the output of the comparator 6, breakers 9 and 13, transformers 12 and 14, a prime mover 10, and a load 11. The controller 8 is a gate control circuit that controls the gates of the thyristors 4. In FIG. 4, a power factor detector and a power factor setting device are omitted.

In operation, the prime mover 10 is started. While the prime mover 10 is held temporarily in a constant-speed state in which the prime mover 10 operates at a constant speed in the range of 10 to 50% of the rated rotating speed, the synchronous phase modifier 2 is connected to the synchronous magnetoelectric generator 1. At this stage, the synchronous phase modifier 2 is not excited. An exciting current substantially equal to the rated current is supplied to the synchronous phase modifier 2 to excite the same for the acquisition of synchronism when the rotating speed of the same is increased near to the synchronous speed. After the acquisition of synchronism, the exciting current is reduced so that the power factor of the armature current of the synchronous phase modifier 2 is nearly equal to 1.0. Then, the rotating speed of the prime mover 10 coupled with the synchronous magnetoelectric generator 1 is increased rapidly to its rated rotating speed. In increasing the rotating speed of the prime mover 10, the exciting current for the synchronous phase modifier 2 is set so that the power factor of the armature current of the synchronous phase modifier 2 is nearly equal to 1.0. Upon the increase of the output voltage of the synchronous magnetoelectric generator 1 near to the rated voltage, namely, a reference voltage, a constant-voltage control mode is started. After thus completing a starting procedure to settle the rotating speed and the voltage of the synchronous magnetoelectric generator 1, the load 11 is connected to the magnetoelectric generating system.

Figure 5:
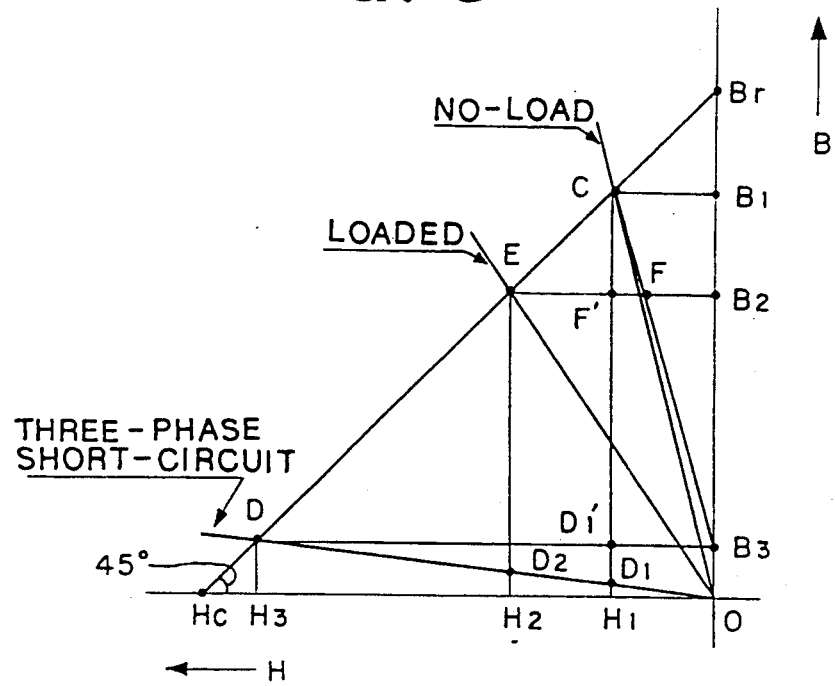
FIG. 5 is a characteristic chart showing the characteristics of permanent magnets serving as the field magnets of a synchronous magnetoelectric generator included in the magnetoelectric generating system of FIG. 4.

The characteristics of the magnetoelectric generating system will be described hereinafter. FIG. 5 is a graph showing the variation of magnetomotive force H (Oe) with magnetic flux density B (G). The operation of the permanent magnet of the synchronous magnetoelectric generator 1 for creating a rotating magnetic field is represented by a recoil line BrHc. In FIG. 5, Br represents residual magnetic flux density and Hc represents coercive force. The rare earth magnet has a magnetic permeability $\mu_s \approx 1$ and hence the inclination of the recoil line on the B-H coordinate system is approximately 45°. When loaded, the synchronous magnetoelectric generator 1 operates at a point E between an operating point C in an open no-load state and an operating point D in a three-phase short-circuit state.

The physical significance of line segments in the graph of FIG. 5 will be described hereinafter. In the no-load state, a line segment $CB_1$ represent the ampereturn (hereinafter referred to as "AT") of the no-load gap, a line segment $CD_1$ represents no-load D-axis magnetic flux, i.e., the product of magnetic flux density and the area of the magnet, that determines the no-load output voltage, a line segment $D_1H_1$ represents no-load leakage flux. In a three-phase short-circuit state, a line segment $DB_3$ represents three-phase short-circuit demagnetization AT, i.e., the d-axis component of three-phase short-circuit armature reaction magnetomotive force, and a line segment $DH_3$ represents three-phase short-circuit leakage flux. In a the loaded state, a line segment EF represents the d-axis component of loaded armature reaction magnetomotive force, a line segment $FB_2$ represents loaded gap AT, a line segment $ED_2$ represents loaded d-axis magnetic flux, and a line segment $D_2H_2$ represents loaded leakage flux.

Figure 6:
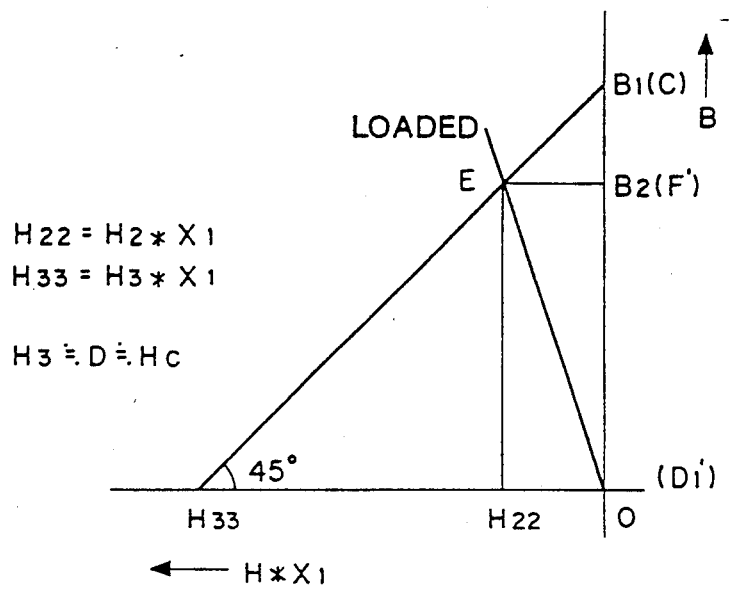
FIG. 6 is a characteristic chart showing the simplified characteristics of permanent magnets serving as the field magnets of the synchronous magnetoelectric generator of the magnetoelectric generating system of FIG. 4.

Supposing that the leakage flux is negligibly small, FIG. 6 is obtained by multiplying the value of the horizontal axis by $X_1$ defined by an expression (1) for coordinate transformation.

$$X_1 = OB_1 / OH_3 \tag{1}$$

The graph of FIG. 6 is produced by neglecting the leakage flux and the gap AT in FIG. 5. Points $B_1$, $B_2$ and O on the vertical axis in FIG. 6 correspond respectively to points C, F' and D' in FIG. 5. Since the leakage flux is neglected, $OB_1 = D_1$, and $C = D_1'C = D_1'D$. $OH_3 = B_3D$, and $X_1 = D_1'D/B_3D$. Accordingly, the multiplication of the values of the magnetomotive force on the horizontal axis by $X_1$ is equivalent to forming a triangle $CDD_1'$ by shifting points F and $B_3$ on a triangle $CDB_3$ respectively to points F' and $D_1'$ in FIG. 5. Thus, the characteristic shown in FIG. 6 can be obtained without taking into consideration the gap AT. In FIG. 6, the vertical axis represents the no-load characteristics, and the horizontal axis represents the three-phase short-circuit characteristics.

The proportional constant $X_1$ is a conversion factor (reactance) for converting the magnetomotive force corresponding to AT, i.e., current, to magnetic flux corresponding to voltage, and enables handling the armature reaction magnetomotive force and the magnetic flux as the same scalar quantity in FIG. 6 without taking into consideration the gap AT. Accordingly, $$EH_{22} + EB_2 = OB_1 \qquad (2)$$

where $EH_{22}$ representing the loaded d-axis magnetic flux corresponds to $ED_2$ in FIG. 5, $EB_2$ representing the d-axis component of the loaded armature reaction magnetomotive force corresponds to EF in FIG. 5. $OB_1$ is equal to $OB_1$ in FIG. 5 and represents the no-load d-axis magnetic flux, namely, an internally induced voltage. Therefore, the expression (2) expresses that the sum of the loaded d-axis magnetic flux and the d-axis component of the loaded armature reaction magnetomotive force is equal to the no-load d-axis magnetic flux.

Figure 7:
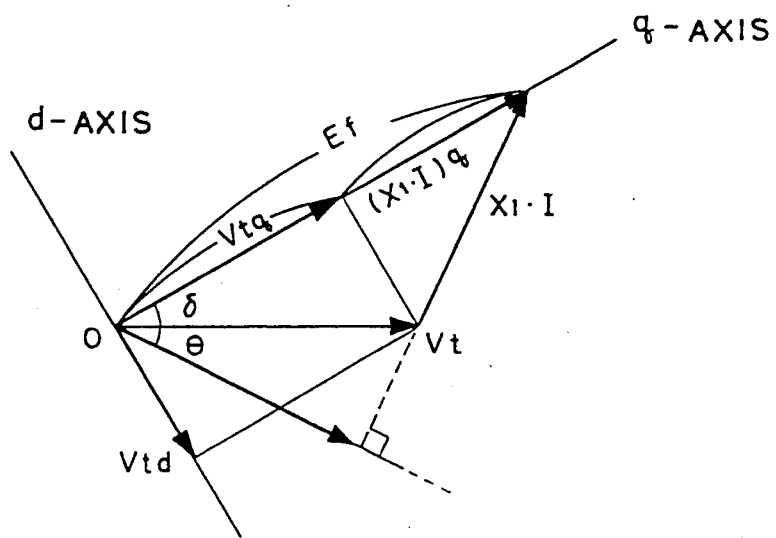
FIG. 7 is an explanatory diagram showing a phasor diagram for the synchronous magnetoelectric generator.

Since the rare earth magnet has a magnetic permeability $\mu_s \simeq 1$, the magnetomotive force is approximately equal to the magnetic flux. The magnetic flux can be converted to a voltage by multiplying the magnetic flux by the number of the effective armature coils of the synchronous magnetoelectric generator 1. Therefore, (the internally induced voltage) = (loaded q-axis voltage) + (the q-axis component of the loaded armature reaction voltage) Thus, the simplified permanent magnet characteristics of FIG. 6 and the q-axis voltage (d-axis magnetic flux) of the phasor diagram of FIG. 7 are brought into mutual relation. In FIG. 7, $E_f$ is the internally induced voltage of the synchronous magnetoelectric generator 1, $(X_1 I)_q$ is the q-axis component of the loaded armature reaction voltage, $V_{tq}$ is the q-axis component of the output voltage, $\delta$ is the internal phase angle. $\theta$ is the power factor angle and I is the current. In FIG. 7, $E_f$ corresponds to $OB_1$ in FIG. 6, $(X_1 \cdot I)_q$ corresponds to $EB_2$ or $B_1B_2$ in FIG. 6, $V_{tq}$ corresponds to $EH_{22}$ or $OB_2$ in FIG. 6. The output voltage $V_t$ is expressed by:

$$\vec{V}_t = \vec{E}_f - jX_1 \cdot \vec{I} \qquad (3)$$

Figure 8:
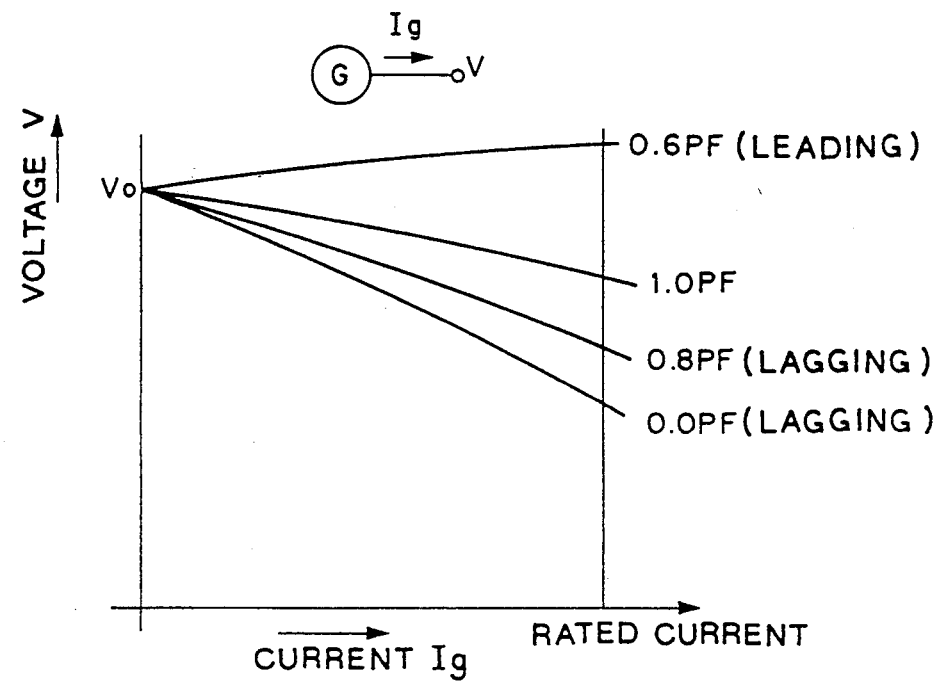
FIG. 8 is a characteristic chart of the individual voltage characteristics of the synchronous magnetoelectric generator.

Accordingly, the relation between the voltage and the current of the synchronous magnetoelectric generator 1 is expressed by individual voltage characteristics shown in FIG. 8. Since the q-axis component of the armature reaction voltage for the lagging current is large, the voltage drops greatly with the current. Since the q-axis component of the armature reaction voltage for the current of a power factor of 1.0 is small, the voltage drops slightly with the current. In contrast, the q-axis component of the armature reaction voltage is small, the output voltage corresponding to the vectorial composition of the q-axis voltage and the d-axis voltage increases with the current.

Figure 9:
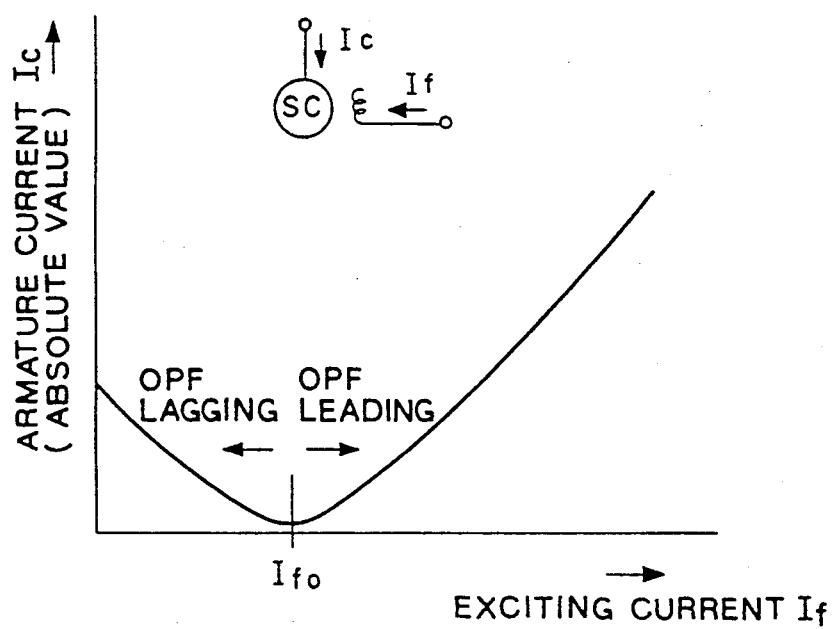
FIG. 9 is a characteristic chart of the armature current characteristics of a synchronous phase modifier included in the magnetoelectric generating system of FIG. 4.

The characteristics of the synchronous phase modifier 2 will be described hereinafter. Referring to FIG. 9, when the exciting current $I_f$ is higher than a current $I_{f0}$, namely, an exciting current at which the power factor of the armature current $I_c$ flowing into the synchronous phase modifier 2 is 1.0, the armature current has a leading power factor, so that the current of the leading power factor increases with the increase of the exciting current. When the exciting current is lower than the current $I_{f0}$, the armature current $I_c$ flowing into the synchronous phase modifier 2 is a current of a lagging power factor, so that the current of the lagging power factor increases with the decrease of the exciting current.

A magnetic flux control algorithm will be described hereinafter with reference to FIG. 10. When the load 11 is connected to the synchronous magnetoelectric generator 1 providing power of an output voltage $V_t$, a load current $I_L$ is determined univocally from the impedance Z of the load 11 as expressed by:

$$\vec{I}_L = \vec{V}_t / \vec{Z} \qquad (4)$$

Figure 10:
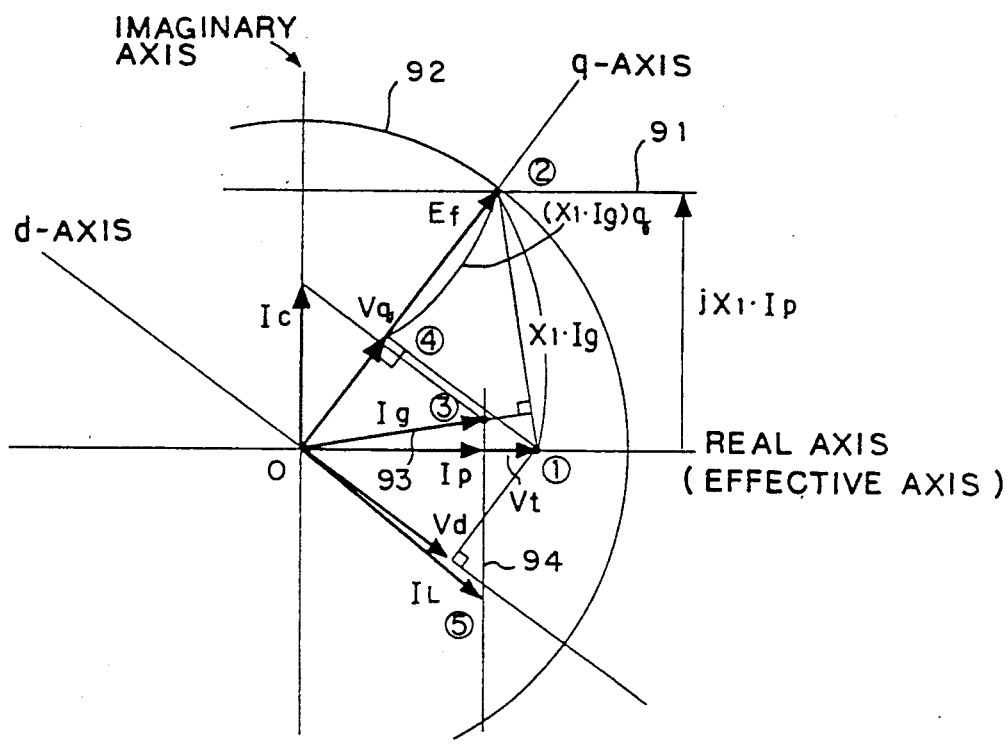
FIG. 10 is a diagram of assistance in explaining a magnetic flux control algorithm employed in the present invention.

In FIG. 10, the active current $I_P$ of the load current $I_L$ is the orthogonal projection of the load current $I_L$ on the output voltage $V_t$, and the active current $I_P$ is supplied by the prime mover 10. The reactive voltage $jX_1 \cdot I_P$ indicated by a line segment 91 is obtained by multiplying the active current $I_P$ by $X_1$. The point ② of intersection of the internally induced voltage $E_f$ and a circle 92 is the position of the q-axis. A point ③ of intersection of a straight line 93 perpendicular to a line connecting the point ② and the extremity ① of the vector of the output voltage and passing the origin O, and a line segment 94 drawn from the extremity ⑤ of the vector of the load current $I_L$ in parallel to the imaginary axis indicates the armature current of the synchronous magnetoelectric motor 1. The armature current $I_c$ of the synchronous phase modifier 2 is indicated by a vector having its extremity at the point of intersection of the imaginary axis and a line segment drawn from the point ③ in parallel to the vector of the load current $I_L$. When the armature current of the synchronous phase modifier 2 is thus determined, the armature current $I_g$ of the synchronous magnetoelectric motor 1 is determined from FIG. 4 and an expression (5). The output voltage $V_t$ is determined by subtracting the loaded armature reaction voltage $jX_1 \cdot I_g$ from the internally induced voltage $E_f$. The armature current $I_c$ makes the internally induced voltage $E_f$ and the output voltage $V_t$ constant is dependent univocally on the load current $I_L$, so that constant voltage control is achieved $$\vec{I}_g = \vec{I}_L + \vec{I}_c \qquad (5)$$

Thus, the q-axis component of the armature reaction voltage due to the load current is controlled by controlling the reactive current by the synchronous phase modifier 2, and the output voltage $V_t$ of the synchronous magnetoelectric generator 1 is maintained constant by maintaining the vector sum of the q-axis voltage ($EH_{22}$ in FIG. 6) and the d-axis voltage constant.

Accordingly, the controller 8 regulates the exciting current $I_f$ for the synchronous phase modifier 2 according to the deviation of the detected output voltage $V_t$ from the reference voltage $V_b$. The controller 8 reduces the exciting current $I_f$ when $V_t > V_b$ or increases the exciting current $I_f$ when $V_t < V_b$. When the exciting current $I_f$ is reduced, the leading component of the armature current $I_c$ decreases, namely, the lagging component of the armature current $I_c$ increases, so that the lagging component of the armature current $I_g$ increases, the armature reaction increases and the d-axis magnetic flux decreases to reduce the output voltage $V_t$. In contrast, the exciting current $I_f$ is increased, to raise the output voltage $V_t$.

Figure 11:
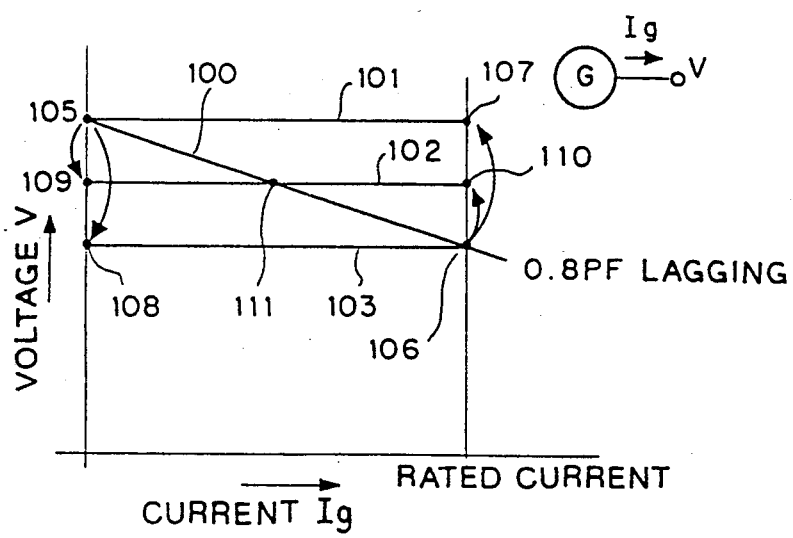
FIG. 11 is a graph showing the relation between the individual voltage characteristics of the synchronous magnetoelectric generator of the magnetoelectric generating system of FIG. 4, and a reference voltage.

Setting of the reference voltage will be described hereinafter with reference to FIG. 11. Referring to FIG. 11, the individual voltage characteristic of the synchronous magnetoelectric generator 1 relative to the load 11 of a lagging power factor of 0.8 is indicated by a line 100. The point 105 of intersection of the individual voltage characteristic line 100 and the voltage axis is the individual no-load voltage, and a voltage 106 corresponding to the rated current is equal to the individual loaded rated voltage (a voltage for a load of the rated output and the rated power factor) Suppose that the reference voltage is set as indicated by a line 101. Then, the no-load armature current $I_c$ (reactive component) of the synchronous phase modifier 2 is zero. In a lagging loaded state, compensation for a voltage from a point 106 to a point 107 is made, requiring a large lagging armature current $I_c$ as indicated by a line 200 in FIG. 12. When the reference voltage is set as indicated by a line 103, the armature current $I_c$ in a rated loading state (reactive component) may be zero. However, in a no-load state, compensation for a voltage from a point 105 to a point 108 is necessary, requiring a large lagging armature current $I_c$ as indicated by a line 201 in FIG. 12.

Figure 12:
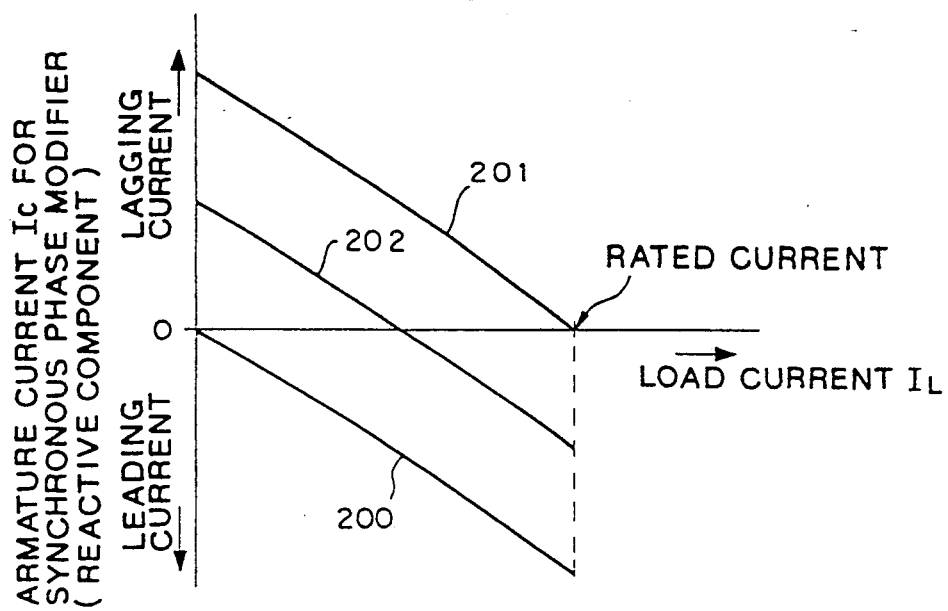
FIG. 12 is a graph of assistance in explaining the armature current characteristics of the synchronous phase modifier for maintaining the output voltage of the synchronous magnetoelectric generator constant.

If the reference voltage 102 is between the individual no-load voltage and the individual rated loaded voltage, compensation for only a small voltage from the point 105 to a point 109 by the lagging armature current $I_c$ is necessary in a no-load state, and compensation of only a small voltage from the point 106 to a point 110 by the leading armature current $I_c$ is necessary in a rated loaded state as indicated by a line 202 in FIG. 12. As is obvious from FIG. 12, the maximum value of the armature current $I_c$ for the synchronous phase modifier 2 can be reduced by setting the reference voltage for a value between the individual no-load voltage and the rated loaded voltage of the synchronous magnetoelectric generator 1. If a transformer 12 is connected to the armature side of the synchronous phase modifier, the transformer 12 may be of a small capacity.

A point 111 of intersection of the individual voltage characteristics line 100 and the reference voltage line 102 is located between the no-load state and the rated loaded state. The armature current $I_c$ of the synchronous phase modifier 2 is a minimum at the point 111, the synchronous phase modifier 2 and the transformer 12 operate at the least loss at the point 111, and the generating system is able to operate at the highest efficiency.

Figure 14:
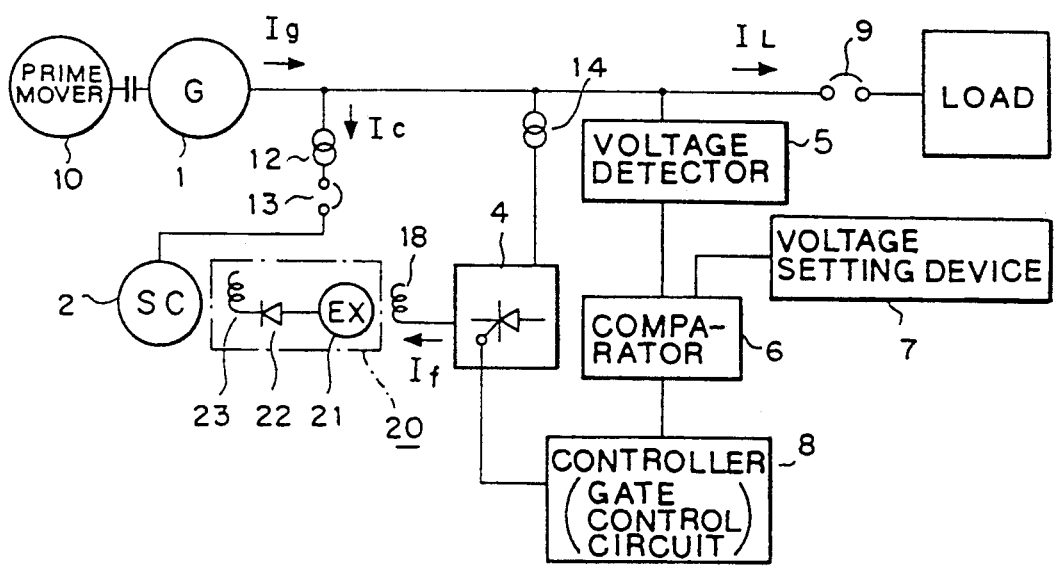
FIG. 14 is a block diagram of a magnetoelectric generating system in a third embodiment according to the present invention.

The constant-voltage magnetoelectric generating system may employ either a static exciting system shown in FIG. 4 or a brushless exciting system for exciting the synchronous phase modifier 2. The exciting system for exciting the synchronous phase modifier 2 may be a self-excitation system as shown in FIG. 4 or 14 using the output of the synchronous magnetoelectric generator 1 or a separated excitation system, not shown, using an external power source. Referring to FIG. 14 showing a magnetoelectric generating system employing a synchronous phase modifier of a brushless excitation system, an exciting current is supplied through a thyristor 4, i.e., an exciting current regulating circuit, to the field winding 18 of an ac exciter (revolving armature type synchronous generator). Shown in FIG. 14 are the rotor 20 of a brushless synchronous phase modifier 2, the armature 21 of the ac exciter, a rotary rectifier 22, and the field winding 23 of the synchronous phase modifier 2. The armature 21, the rotary rectifier 22 and the field winding 23 are mounted on the rotor 20. A synchronous phase modifier 2 is held stationary. The rest of the components are the same as those shown in FIG. 4, and the description thereof will be omitted to avoid duplication.

The constant-voltage magnetoelectric generating system may start the synchronous phase modifier 2 by either a low-frequency starting system that supplies a current to the synchronous phase modifier 2 simultaneously with the start of the synchronous magnetoelectric generator 1 or a system that applies a full voltage or a reduced voltage to the synchronous phase modifier 2 for starting after the completion of starting the synchronous magnetoelectric generator 1.

Figure 13:
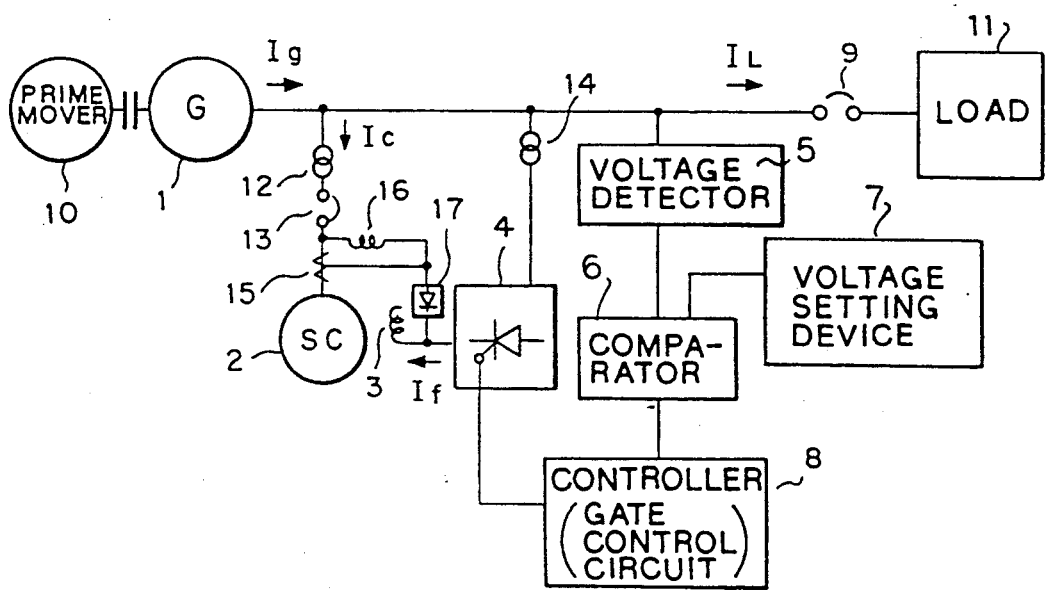
FIG. 13 is a block diagram of a magnetoelectric generating system in a second embodiment according to the present invention.

As shown in FIG. 13, the constant-voltage magnetoelectric generating system may use the vector sum of the secondary current of a current transformer 15 and the current flowing through a reactor 16 for compound characteristics, convert the vector sum into a dc current, and supply the dc current through the exciting current regulating circuit to an exciting winding 3.

As is apparent from the foregoing description, the magnetoelectric generating system according to the present invention comprising the synchronous magnetoelectric generator, the synchronous phase modifier connected to the output side of the synchronous magnetoelectric generator, the comparator for comparing the output voltage of the synchronous magnetoelectric generator detected by the voltage detector and the reference voltage set by means of the voltage setting device, and a controller for controlling the exciting current regulating circuit connected to the field winding of the synchronous phase modifier according to the output of the comparator does not need to resort to an inefficient conventional voltage control method that cuts off the voltage peaks exceeding a predetermined voltage with Zener diodes and is capable of compensating for excessive voltage drop so that power of a constant voltage can be generated at a high efficiency. The magnetoelectric generating system in accordance with the present invention enables the application of the synchronous magnetoelectric generator to purposes requiring a synchronous magnetoelectric generator having a large capacity. Setting the reference voltage of the magnetoelectric generating system for a voltage between the no-load voltage and the rated loaded voltage of the synchronous magnetoelectric generator reduces the armature current (reactive component) of the synchronous phase modifier in an intermediate loaded state to the least extent. Such a possibility of reducing the armature current of the synchronous phase modifier to the least extent enables the synchronous magnetoelectric generator to operate at the highest possible efficiency and suppresses the maximum leading and lagging currents, and hence the synchronous phase modifier may be of a comparatively small capacity.

What is claimed is:

1. A magnetoelectric generating system comprising: a synchronous magnetoelectric generator provided with permanent magnets for creating a rotating magnetic field; a synchronous phase modifier connected to the output side of the synchronous magnetoelectric generator; a voltage detector for detecting the output voltage of the synchronous magnetoelectric generator; a comparator for comparing the voltage detected by the voltage detector and a reference voltage set by means of a voltage setting device; an exciting current regulating circuit connected to the field winding of the synchronous phase modifier; and a controller for controlling the exciting current regulating circuit according to the output of the comparator.

2. A magnetoelectric generating system according to claim 1, wherein the synchronous phase modifier is connected to the synchronous magnetoelectric generator so that the armature current of the synchronous magnetoelectric generator is equal to the sum of a load current and the armature current of the synchronous phase modifier.

3. A magnetoelectric generating system according to claim 2, wherein the output voltage of the synchronous magnetoelectric generator is controlled by the reactive current by the synchronous phase modifier.

4. A magnetoelectric generating system according to claim 3, wherein the controller controls the exciting current regulating circuit so that the exciting current for the synchronous phase modifier is reduced when the voltage detected by the voltage detector is higher than the reference voltage, and controls the exciting current regulating circuit so that the exciting current for the synchronous phase modifier is increased when the voltage detected by the voltage detector is lower than the reference voltage.

5. A magnetoelectric generating system according to claim 4, wherein the reference voltage set by means of the voltage setting device is between the individual no-load voltage and the individual rated loaded voltage of the synchronous magnetoelectric generator.

6. A magnetoelectric generating system according to any one of claims 1 to 5, further comprising: a reactor connected to the armature of the synchronous phase modifier; a current modifier connected to the armature of the synchronous-phase modifier; and a rectifier for rectifying the sum of the current flowing through the reactor and the output of the current transformer and for supplying the rectified current to the exciting winding of the synchronous phase modifier.

7. A magnetroelectric generating system according to claim 6, wherein the synchronous phase modifier is excited by a static excitation system.

8. A magnetoelectric generating system according to any one of claims 1 to 5, wherein the synchronous phase modifier is excited by a static excitation system.

9. A magnetoelectric generating system according to any one of claims 1 to 5, wherein the synchronous phase modifier is excited by a brushless excitation system.

10. A magnetoelectric generating system according to claim 9, wherein the exciting current regulating circuit regulates the exciting current supplied to the field winding of the synchronous phase modifier, mounted on the rotor of the synchronous phase modifier.

* * * * *